United States Patent [19]

Fyler

[11] Patent Number: 4,712,971
[45] Date of Patent: Dec. 15, 1987

[54] CONTROL ARM ASSEMBLY
[75] Inventor: Donald C. Fyler, Cambridge, Mass.
[73] Assignee: The Charles Stark Draper Laboratory, Inc., Cambridge, Mass.
[21] Appl. No.: 701,151
[22] Filed: Feb. 13, 1985
[51] Int. Cl.[4] ............................................. B25J 17/00
[52] U.S. Cl. .................................. 414/744 R; 901/15; 901/23
[58] Field of Search ....................... 901/15, 17, 21, 23, 901/24, 25, 41; 414/744 R

[56] References Cited

U.S. PATENT DOCUMENTS 4,329,111  5/1982  Schmid .............................. 901/15 X
4,390,775  6/1983  Biava et al. ........................ 901/15 X
4,505,166  3/1985  Tesar ................................. 901/23 X

FOREIGN PATENT DOCUMENTS 112789  8/1980  Japan ...................................... 901/17

OTHER PUBLICATIONS

Langrana et al.; "Analysis of Dynamic Systems Using Heuristic Optimization"; Journal of Dynamic Systems, Meas., and Control; Mar. 1980, vol. 102, pp. 35-40.
Gaffney et al.; "Character Identification Device", IBM Technical Disclosure Bulletin, vol. 3 No. 4, 9/1960.

Primary Examiner—Leslie J. Paperner
Assistant Examiner—D. Glenn Dayoan
Attorney, Agent, or Firm—Lahive & Cockfield

[57] ABSTRACT

A robotic control arm apparatus or control arm for controlling the position of a control point associated with a controlled element within a reference plane and with respect to two reference points in a work space. The control arm assembly includes at least four link members mutually coupled in series to form a closed loop linkage, each of the link members being coupled about a pivot axis at each end. The apparatus may include a set of roller assemblies affixed to the control arm assembly, each roller assembly including a roller element and an endless belt disposed about the roller elements for driving the controlled element.

13 Claims, 9 Drawing Figures

CONTROL ARM ASSEMBLY

BACKGROUND OF THE INVENTION

The present invention is in the field of robot arm devices and more particularly relates to a multiple link control arm assembly.

Robot arm devices, or control arms, in the prior art are generally in the form of multiple link assemblies, having actuators for controlling the relative motion of the respective links in order to control the position of a control point in a work space. For example, a one-arm manipulator, or two bar linkage control arm, might control the position of a control point in a plane. Such manipulators include a first link member pivotably coupled at one end about an axis passing through a reference point on a support member. At its other end, the first link member is pivotably coupled to one end of a second link member. The control point is positioned at the other end of the second link member. Typically, a first drive motor on the support arm is adapted to control the angular position of the first link member with respect to the support member. A second drive motor mounted on the first or second link member controls the angular position of the second link member with respect to the first link member. The two motors may be selectively actuated to control the position of the control point in a predetermined work space. Such control arms have found use in industrial environments, where the control point may be coupled to a tool (such as a welder, or a cutting element) or to a manipulator (such as a limp fabric controller in an automated sewing, or garment assembly system).

One such commercially available device is the IBM 7540 arm. That arm is adapted so that its control point may be rotated about a fixed axis and a variable axis, which axes are spaced apart by the first link member. The position of the control point is controlled by two variables: the "first" angle between the first link member and a reference axis, and a "second" angle between the first and second link members. A work space is defined for the control point by limiting the first angle to the values of 0–200 degrees and by limiting the second angle to the values of 0–160 degrees. However, the work space envelope established with these constraints provides a relatively eccentric grid pattern requiring substantially different first angle and second angle displacements to achieve uniform motion of the control point within the work space.

Conventional control arms typically use servomotors as a power source for controlling the position of the control point in the work space. Such servomotors are generally operated at relatively high mechanical output frequencies and provide high output power for arm control. Since the required rate of angular motion of the arm components is substantially less than the output mechanical frequencies of the servomotors, step-down gear trains are typically used in order to provide the necessary speed reduction (from servomotor-to-arm). However, the gear trains introduce backlash, friction and mechanical stiffness, all of which place severe performance limitations on such control arms.

In an alternative approach, high-torque, low speed direct drive motors are used for arm control. While such direct drive motors, often in the form of brushless DC motors driven by PWM servo amplifiers, can provide suitable drive capability in some respects, there are still substantial limitations to such configurations. Particularly, static loading on the arm can cause overheating of the motor. Further, in serial link configurations, where a first drive motor may be mounted on the support member, and a second drive motor is mounted on a moving member, the weight of the second motor becomes a load on the first motor (requiring that the successive motors be correspondingly powered to accommodate such loading). Moreover, in such configurations reaction torques of the second motor acts upon the first motor.

Accordingly, it is an object of the present invention to provide an improved control arm for positioning a control point.

It is another object to provide for improved force-speed characteristics at the control point of a control arm.

SUMMARY OF THE INVENTION

The present invention is a control arm apparatus or control arm, for controlling the position of a control point associated with a controlled element within a reference plane and with respect to two reference points in a work space. Typically, the control point is constrained to two dimensional movements in a reference plane including the two reference points. The two reference points are generally spaced apart, but in some forms of the invention, may be coincident.

The control arm includes a first link member having a first end pivotably coupled to a support element. That first end is pivotable about a first pivot axis perpendicular to the reference plane and passes through a first of the reference points. A second link member has its first end pivotably coupled to a support element as well. The first end of that second member is pivotable about a second pivot axis perpendicular to the reference plane and passing through a second of the reference points. A third link member has a first end pivotably connected to the second end of the first link member about a third pivot axis perpendicular to the reference plane. A fourth link member has a first end pivotably coupled to the second end of the second link member about a fourth pivot axis perpendicular to the reference plane. A coupling apparatus is provided for pivotably coupling the second end of the third link member to the second end of the fourth link member about a fifth pivot axis perpendicular to the reference plane. The control element is coupled to one of the third or fourth link members.

In various forms of the invention, the support element may include an associated planar work surface substantially parallel to the reference plane, where the controlled element is adapted to support a work element for performing predetermined operations at points displaced from the control point along an axis perpendicular to the reference plane and passing through a point located at the control point. Alternatively, such operations may be performed at points laterally offset along the third link member by a distance less than the distance between the third and fifth pivot axes, or laterally offset along the fourth link member by a distance less than the distance between the fourth and fifth pivot axes.

In various forms of the invention, a selectively operable assembly may be used to control the angular position of the first and second link members with respect to the reference axes passing through a first and second reference points. That assembly in some forms includes a first motor and associated linkage adapted to selectively control the angular position of the first link member with respect to the support member. A second motor and associated linkage may be operative in concert with the first motor and adapted to selectively control the angular position of the second link member with respect to the support member. The control point is then positionable in a planar work space in response to the controlled motion of the first and second link members.

In some forms of the invention, a power source for driving and/or orienting the work element may include a motor affixed to a support, and an associated assembly for coupling that power source to the work element. The coupling assembly may include a pivotable roller at the junction of each of the link members and a belt or chain, or the like, passing circumferentially around those rollers, and a means for coupling the work element motor to the belt or chain.

In one form of the invention, the distance between the pivot axes of the first link member is substantially equal to the distance between the pivot axes of the second link member. The distance between the pivot axes of the third link member may also equal the distance between the pivot axes of the fourth link member.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
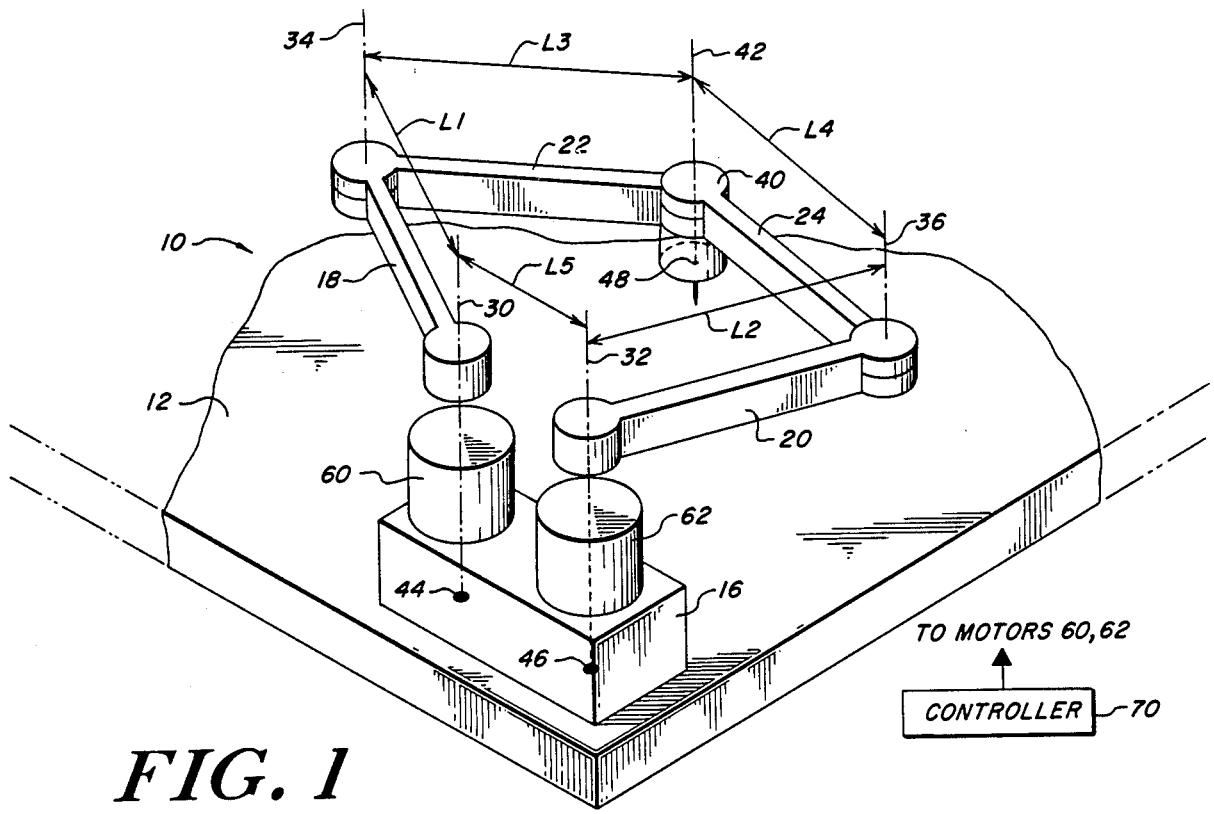
FIG. 1 shows in schematic form an exemplary embodiment of a control arm in accordance with the present invention.

FIG. 1 shows an exemplary control arm 10 in accordance with the present invention. The arm 10 is shown with respect to a worktable having a substantially planar upper surface 12. The arm 10 includes a support member 16, which supports a first link member 18, second link member 20, third link member 22 and fourth link member 24, and associated couplers for the respective link members. The link member 18 is pivotally coupled to the support member 16 about a reference axis 30. The second link member 20 is pivotally coupled at a first end to the support member 16 about a reference axis 32. The distal end of link member 18 is pivotally coupled to one end of link member 22 about a reference axis 34. Similarly, the link member 24 is pivotally coupled to the distal end of link member 20 about a reference axis 36. A coupler 40 is adapted to pivotally couple the distal ends of link members 22 and 24 about a reference axis 42. In the present embodiment, axes 34, 36 and 42 are all substantially parallel to the axes 30 and 32, all such axes being perpendicular to the planar work surface 12.

The axes 30 and 34 are spaced apart by a distance L1 in the direction parallel to the surface 12, the axes 32 and 36 are spaced apart by a distance L3 in that direction, the axes 34 and 42 are spaced apart by a distance L3 in that direction. The axes 36 and 42 are spaced apart by a distance L4 in that direction, and the axes 30 and 32 are spaced apart by a distance L5 in that direction parallel to the surface 12.

In this configuration, the axes 30 and 32 are considered to pass through respective ones of reference points 44 and 46, respectively, which lie in the plane of surface 12. Further, the coupler 40 includes a control point 48 located substantially along axis 42. With the configuration shown in FIG. 1, the position of the control point 48 is controlled to be within a reference plane defined by points 48, 44 and 46.

A first drive motor 60 is coupled to the link member 18 and is adapted to selectively angularly position that link member 18 about the axis 30 in response to a control signal from a controller 70 (which may be a programmed digital computer, for example). Similarly, a drive motor 62 is coupled to the link member 20. Motor 62 is adapted to angularly position link member 20 about the axis 32 in response to a control signal from controller 70. With this configuration, a five bar linkage drive assembly is provided to control the position of control point 48 with respect to the reference points 44 and 46. Alternatively, control points may be established at points along the link member 22 offset from point 48 by a distance less than L3, or at points along the link member 24 offset from point 48 by a distance less than L4.

Figure 2:
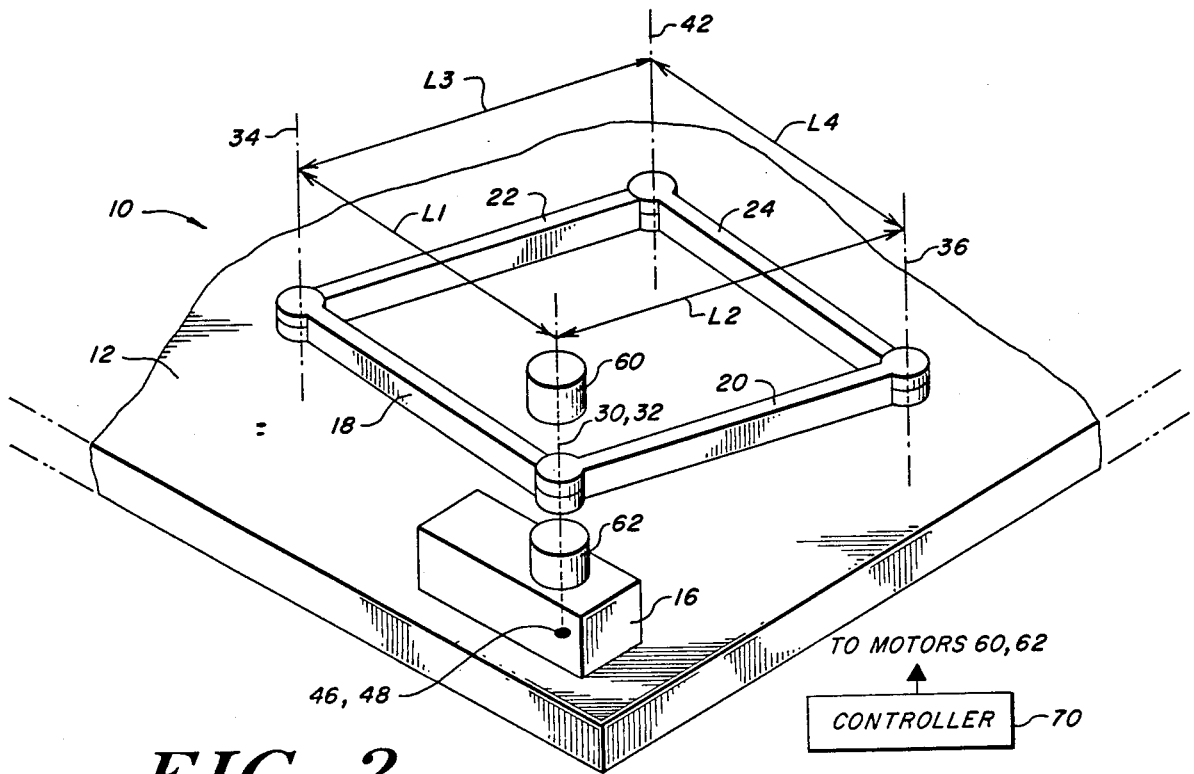
FIG. 2 shows in schematic form another exemplary embodiment of a control arm in accordance with the present invention.

FIG. 2 shows a substantially similar five bar linkage control arm to the assembly shown in FIG. 1, except that the FIG. 2 configuration has a "degenerate" fifth link, where the distance L5 is zero, and the axes 30 and 32 are coaxial and points 44 and 46 are coincident. In the configuration of FIG. 2, the drive motor 62 is shown beneath link member 18, and the drive motor 60 for member 20 is shown above that member 20 with the respective motor drive shafts being coaxial. In FIG. 2, elements which correspond to elements in the configuration of FIG. 1 have identical reference designations.

The assemblies shown in FIGS. 1 and 2 are advantageous compared with the prior art for a number of reasons. First of all, in both configurations, the motors may be substantially equal in size, so that there is no problem with respect to variation in motor size and loading of motors in a serial configuration, such as found in the prior art. Further, there is relatively little interaction between the reaction torque of the second motor upon the first motor compared to a single arm robot arm with similar reach. Furthermore, both of the motors in these configurations are mounted on the support member 16, so that there are no problems of flexing wires and motor inertia which occur when motors are mounted on the respective moving members in the prior art type serial link control arms.

Figure 3:
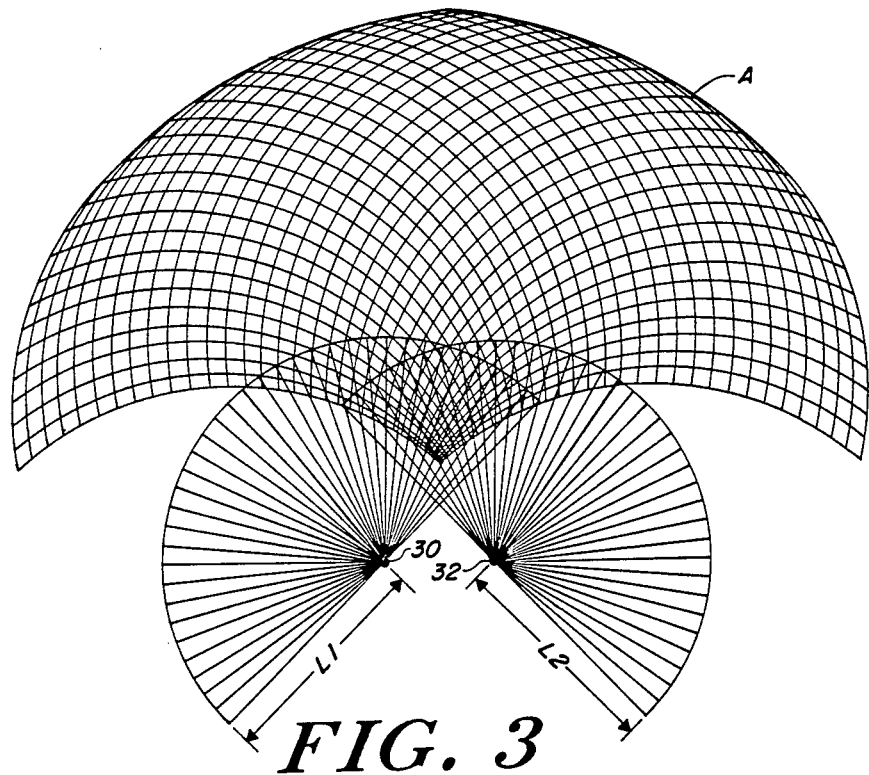
FIG. 3 illustrates the work space of the control arm of FIG. 1.
Figure 4:
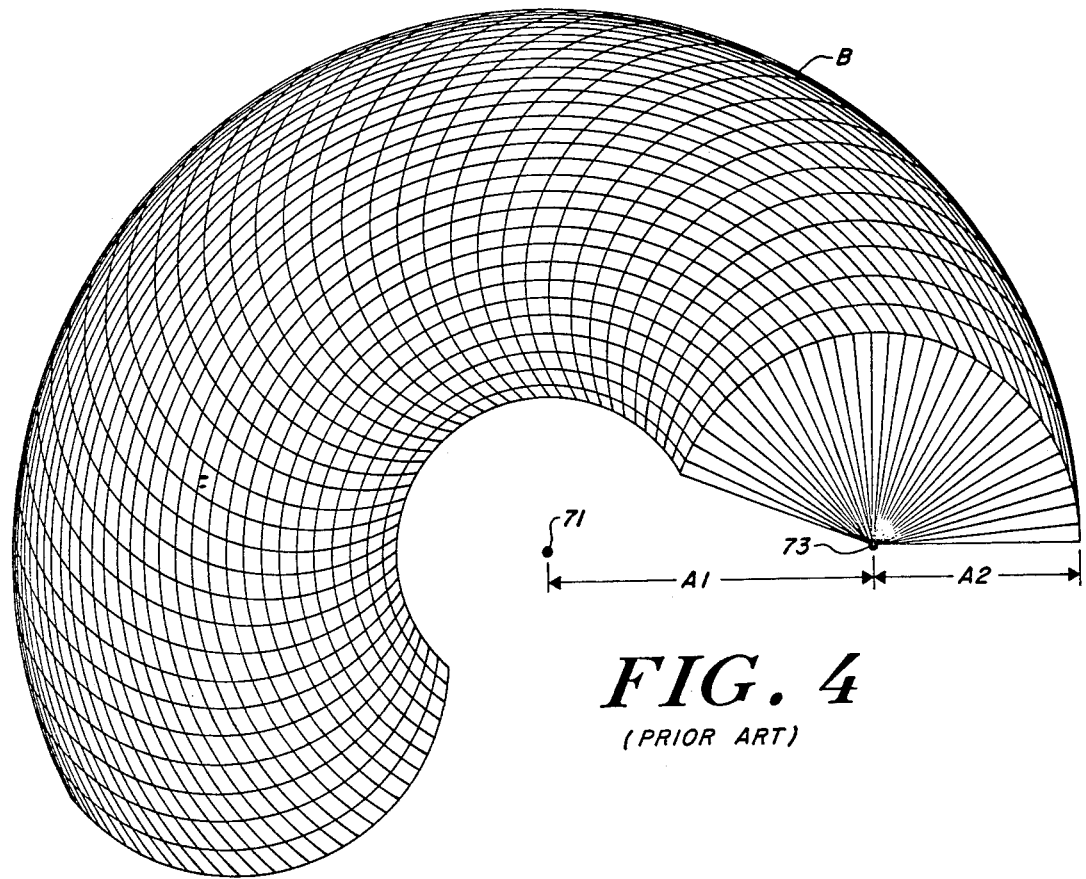
FIG. 4 illustrates the work space for a prior art control arm.

FIG. 3 shows the work space envelope for the configuration of FIG. 1 where L1=L2=2, L3=L4=3 and L5=1. In FIG. 3, five degree incremental motions of each of links 18 and 20 about axes 30 and 32, respectively, are illustrated, together with the loci of the control point for each position. In contrast, FIG. 4 shows the work space envelope B provided by a comparable reach two link control arm, such as the IBM 7540, of the prior art, having a first link L1 pivotable about a fixed axis at point 71 and a second link pivotably coupled to the first link at a movable point 73. The distance between the points 71 and 73 is A1 and the distance between the point 73 and the control point on the second link is A2 where A1=1.575 D.C.F. and A2=1. The work space B is shown for five degree incremental motions of the link members. As may be noted from FIGS. 3 and 4, the work space of FIG. 3 includes a substantially uniform and symmetrical "grid-like" work space "A" while the prior art work space includes a relatively non-uniform, eccentric work space grid "B". The present invention thus permits relatively even motions to be provided by both drive motors in the configuration of FIG. 1 to achieve similar orthogonal control point movements compared to the unequal drive requirements of the prior art approach to achieve the same motion as shown in FIG. 4). Consequently, the drive motors 60 and 62 of the FIG. 1 configuration may readily be of the same driving capability and substantially matched, providing improved performance compared to the prior art.

The configuration of FIG. 1 further defines a different reach, or work space envelope compared with the prior art work space envelope. In some cases, in the configuration of FIG. 1, the reach away can be greater than the reach away for the prior art drive, since for the same motor size, a side load on the endpoint can be countered by a straight line load on the end point. In contrast, in the prior art configuration, the same sideload would need to be countered by a moment. This moment places a strain on the motor resulting in a smaller reach away range for the same motor size than that would result from the system of FIG. 1. When the respective drives react to a sideload on the end point at the extremes of their reach, the effects are most pronounced. Moreover, at extremes of reach, the configuration of the present invention permits operation with relatively low motor torque requirements compared with a two link arm of comparable reach.

Figure 5A:
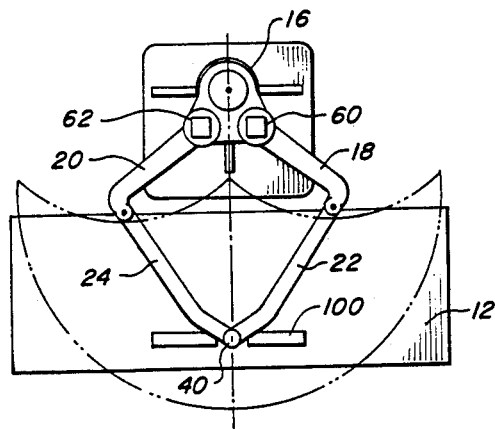
FIGS. 5A–5C show top, front and side elevation views of an embodiment of the present invention.
Figure 5B:
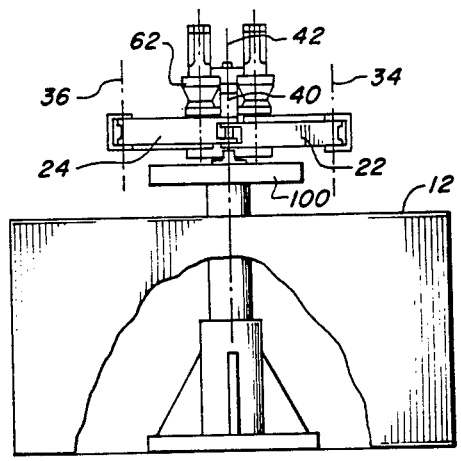
Figure 5C:
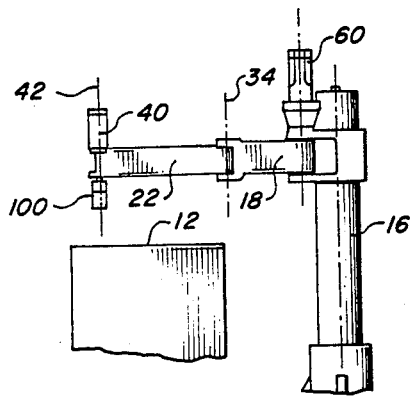

FIGS. 5A–5C show top, front, and side elevation views of an exemplary control arm which is similar to that of FIG. 1. In FIGS. 5A–5C elements corresponding to elements in FIG. 1 have identical reference designations. In FIG. 5A, the work space envelope is illustrated in dash-dot-dot lines superimposed on the surface. In comparing that envelope to the work space configuration shown in FIG. 3, it may be seen that the surface 12 is almost entirely serviced by a highly uniform grid.

Figure 6:
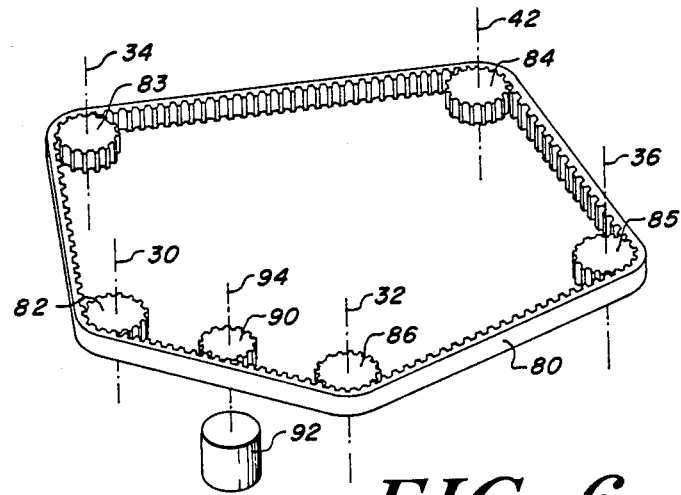
FIGS. 6 and 7 illustrate belt drive configurations for the control element of the embodiment of FIG. 1.

FIG. 6 illustrates a toothed drive belt 80 and an associated roller assembly affixed to the control drive 10. The roller assembly includes five toothed rollers 82–86 coupled thereto for controlling a work element attached to control element 40 in the embodiment of FIG. 1. Each of rollers 82–86 is coaxial with a respective one of axes 30, 34, 42, 36 and 32 and has substantially the same radius. A separate toothed drive roller 90 is also coupled to belt 80. A motor 92 is adapted to selectively drive roller 90 about an axis 94 so that the belt 80 may be selectively driven about the rollers 82–86. The roller 84 is adapted to drive a work element (illustrated as element 100 in FIGS. 5A–5C) attached to the controlled element 40 in response to motion of the belt 80. As a result, the belt 80 may be used to angularly orient element 100 with respect to the work space, under the control of controller 70, for example, Alternatively, where element 100 is a work element requiring power, such as a drill bit, for example, the belt 80 may be controlled to transfer the desired power from the remotely located drive motor 92. In other embodiments different "endless belt" and drive configurations may be used. For example, the toothed belt and rollers of FIG. 6 may be replaced with chain and sprocket assemblies, or by friction driven smooth belt, or cable, assemblies.

Figure 7:
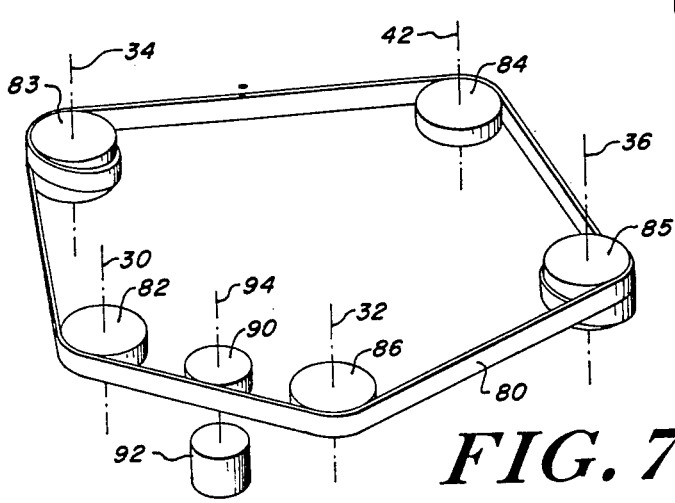

FIG. 7 shows an embodiment similar to that in FIG. 6 but where the belt 80 wraps completely about roller 83 and 85. In FIGS. 6 and 7 similar elements are being denoted by identical reference designations. In FIG. 7, the method of driving belt 80 (e.g., by chain-sprocket or friction) is not shown. The configuration of FIG. 7, the closed loop linkage formed by the L1 link member 18, L2 link member 20, L3 link member 22, L4 link member 24 and the L5 link member (formed by support 16) may include interior angles formed by the L1 and L3 link members and by the L2 and L4 link members which exceed 180 degrees while maintaining the belt 80 without slack throughout the range of motion of the control arm 10. In other embodiments, the belt 80 may be similarly wrapped around others of the rollers (e.g., rollers 82 and 86) where such angular excursions are desired.

In other embodiments, additional separate belts, like belt 80, may be used to provide power, orientation, or other functions to the controlled element, while permitting the power source for such functions to be remote from the moving links of the control arm. A similar roller assembly (incorporating only four rollers) may be used for the embodiment of FIG. 2. In that embodiment one roller is associated with the coincident pivot axes.

Of course, multiple linked belts of the conventional type (for example a single endless belt on link member 18 coupled to a single endless belt or link member 22) might also be used, but at reduced efficiency compared with the circumferential belt assembly of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control arm apparatus for controlling the position of a control point fixedly positioned with respect to a controlled element within a reference plane with respect to a reference points in said plane, comprising:
   a control arm assembly including:
   A. a first link member, said first link member having a first end pivotably coupled to a support element, said first end being pivotable about a first pivot axis perpendicular to said plane and passing through a first of said reference points,
   B. a second link member, said second link member having a first and pivotably coupled to a support element, said first end being pivotable about a second pivot axis perpendicular to said plane and passing through the second of said reference points,
   C. a third link member, said third link member having a first end pivotably coupled to the second end of said first link member about a third pivot axis perpendicular to said plane,
   D. a fourth elongated link member, said fourth link member having a first end pivotably coupled to the second end of said second link member about a fourth pivot axis perpendicular to said plane, E. means for pivotably coupling the second end of said third link member and the second end of said fourth link members about a fifth pivot axis perpendicular to said reference plane and passing through said control point, and F. means for coupling said controlled element to one of said third and fourth link members, and further comprising a selectively operable control means for independently controlling the angular position of each of said first and second link members with respect to said reference axes passing through said first and second reference points.

2. A control arm according to claim 1 wherein said two reference points are spaced apart in said reference plane.

3. A control arm according to claim 1 wherein said two reference points are coincident in said reference plane.

4. A control arm according to claims 2 or 3 wherein said control means includes a first motor and linkage coupled thereto adapted to selectively control the angular position of said first link member with respect to said support member.

5. A control arm according to claim 4 wherein said control means further includes a second motor and linkage coupled thereto, said second motor being operative in concert with said first motor and adapted to selectively control the angular position of said second link member with respect to said second support member.

6. A control arm according to claims 2 or 3 wherein said support element includes a planar work surface substantially parallel to said reference plane, and
wherein said controlled element includes a means for coupling a work element adapted to perform predetermined operations at points displaced from said control point along an axis perpendicular to said plane and passing through a point located substantially at said control point.

7. A control arm according to claims 2 or 3 wherein the distance between said first and third pivot axes is substantially equal to the distance between said second and fourth pivot axes.

8. A control arm according to claim 7 wherein the distance between said third and fifth pivot axes is substantially equal to the distance between said fourth and fifth pivot axes.

9. A control arm according to claim 2, further comprising:
a set of five roller assemblies affixed to said control arm assembly, each roller assembly including a roller element adopted for rotary motion about a respective one of said pivot axes, said rollers having substantially the same radius at their respective peripheral lateral surfaces, an endless belt disposed about said roller elements said belt being movable in at least one direction about all of said pivot axes,
means for coupling said controlled element to said belt, and
means for selectively driving said belt about said roller elements.

10. A control arm according to claim 3, further comprising:
a set of four roller assemblies affixed to said control arm assembly, each roller assembly including a roller element adopted for rotary motion about a respective one of said pivot axes, said rollers having substantially the same radius at their respective peripheral lateral surfaces, an endless belt disposed about said roller elements said belt being movable in at least one direction about all of said pivot axes,
means for coupling said controlled element to said belt, and
means for selectively driving said belt about said roller elements.

11. A control arm according to claim 1 wherein said means for coupling said controlled element includes means for coupling said controlled element to said third link member whereby said control point is laterally displaced from said fifth pivot axis by a distance less than the distance between said third and fifth pivot axes.

12. A control arm according to claim 1 wherein said means for coupling said control arm includes means for coupling said controlled element to said fourth link member whereby said control point is laterally displaced from said fifth pivot axis by a distance less than the distance between said fourth and fifth pivot axes.

13. A control arm apparatus for controlling a controlled element in the direction of a reference plane comprising:

A. a control arm assembly including at least four link members mutually coupled in series to form a closed loop linkage, each of said link members being coupled about a pivot axis at each end thereto to the next link member in said closed loop linkage, said pivot axes being substantially parallel.

B. means for coupling said controlled element to at least one of said link members, C. a set of roller assemblies affixed to said control arm assembly, each roller assembly including a roller element adopted for rotary motion about a respective one of said pivot axes, said rollers having substantially the same radius at their respective peripheral lateral surfaces, D. an endless belt disposed about said roller elements said belt being movable in at least one direction about all of said pivot axes, E. means for coupling said controlled element to said belt, and F. means for selectively driving said belt about said roller elements.

* * * * *